2,801,487

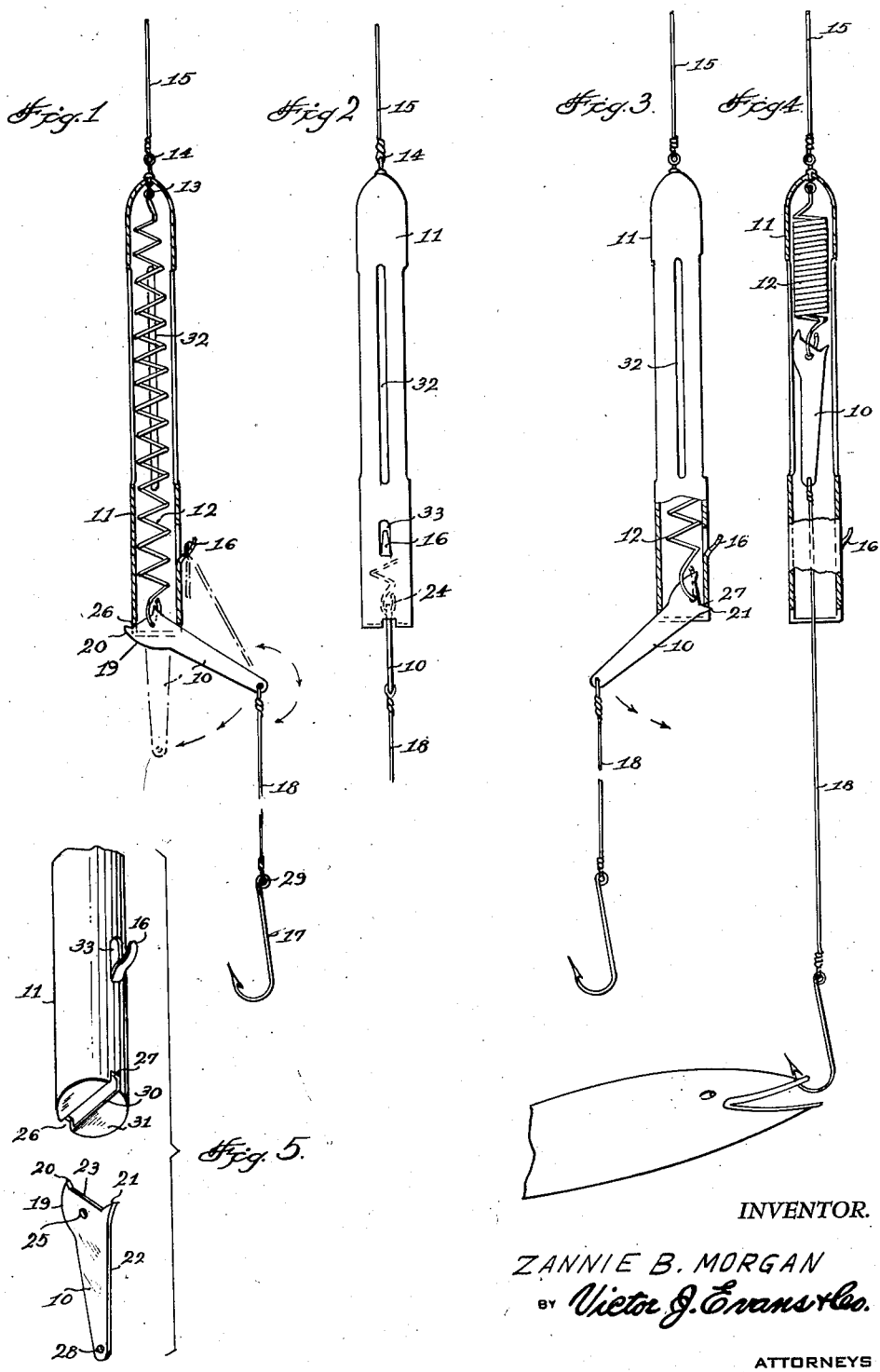
Aug. 6, 1957 — Z. B. MORGAN — 2,801,487
FISHHOOK SPRING SET
Filed May 18, 1955
INVENTOR.
ZANNIE B. MORGAN
BY Victor J. Evans & Co.
ATTORNEYS United States Patent Office
2,801,487
Patented Aug. 6, 1957

FISHHOOK SPRING SET

Zannie B. Morgan, Winters, Tex.

Application May 18, 1955, Serial No. 509,214

3 Claims. (Cl. 43—15)

This invention relates to fishing tackle and particularly to devices used in combination with fish hooks for automatically setting a hook in the mouth of a fish, and in particular, a trigger attached to a spring in a barrel or elongated tubular casing with a hook attached by a leader to an extended end of the trigger and with the end of the casing opposite to that in which the trigger is positioned adapted to be attached to a fishing line whereby with the trigger retained in slots in the end of the casing by the spring a pull on the leader extended from the hook such as resulting from a fish striking the hook or bait thereon actuates the trigger to a released position whereby the spring snaps the trigger upwardly into the casing instantly setting the hook in the mouth of the fish.

The purpose of this invention is to provide hook setting means positioned adjacent a hook on a fishing line whereby a hook taken by a fish is instantly retracted without the loss of time resulting from transmitting the pull of a fish through a fishing line to a rod and the return of the snap action of the fisherman from the rod to the hook.

In the conventional manner of still fishing, such as with a bait on a hook, numerous fish are lost by the fish taking the bait and expelling the hook before a fisherman responds to the strike and where automatic reacting devices are positioned on fishing rods the time resulting from the strike being transmitted through the fishing line to the rod and the reacting force back to the hook is too long to set the hook before it is expelled from the fish. With this thought in mind, this invention contemplates a spring actuated hook setting device positioned adjacent the hook whereby the reaction is substantially instantaneous so that a hook may be set before it is expelled from the mouth of the fish.

Another object of the invention is to provide an automatic fish setting device that is adapted to be incorporated in conventional fishing lines.

A further object of the invention is to provide a device for instantly setting a hook in the mouth of a fish as the fish strikes bait on the hook in which the device is of a simple and economical construction.

With these and other objects and advantages in view, the invention embodies an elongated tubular casing somewhat similar to the barrel of a fountain pen having a slot in one end, openings therethrough, a horn on one side and a fishing line attaching eye extended from one end, a trigger normally retained in the slot in the end of the casing by a spring in the casing and a hook attached by a leader to the extended end of the trigger.

Other features and advantages of the invention will appear from the following description, taken in connection with the drawing, wherein:

Figure 1 is a vertical section through the spring actuated fish hook setting device showing the device in the cocked or fishing position.

Figure 2 is an elevational view of the device taken from a point at a right angle to that from which the section shown in Figure 1 is taken.

Figure 3 is a side elevational view showing a modification in which the trigger is turned to a cocked position in the opposite side of the casing, the lower part of the casing being broken away and parts thereof being shown in section.

Figure 4 is a vertical section through the device with the parts released by the pull of a fish on a hook, as shown, and wherein the trigger is drawn upwardly into the casing by the spring.

Figure 5 is an exploded view showing the trigger removed from and spaced below the lower end of the casing with the upper part of the casing broken away and with the parts shown in perspective.

Referring now to the drawing, wherein like reference characters denote corresponding parts, the improved fish hook spring set of this invention includes a trigger 10, a tubular casing 11, a spring 12 positioned in the casing, an eye 13 for attaching one end of the spring to the casing, an eye 14 extended from the opposite end of the casing to that in which the trigger is positioned and providing means for attaching the casing to a fishing line, as indicated by the numeral 15, a horn 16 positioned on one side of the casing and a hook 17 attached to the trigger 10 with a leader 18.

The trigger 10 is formed with an enlarged arcuate portion 19 with a prong 20 on the end thereof at one side and also with a prong 21 at the end of a relatively straight side 22 and also at the end of a relatively straight end portion 23. An eye 24 on the end of the spring 12 is attached to the trigger through an opening 25 that is positioned a greater distance from the prong 20 than from the prong 21 whereby the pull required to actuate the trigger to a released position is greater with the prong 20 retained against an edge 26 of the casing, as shown in Figure 1, than with the prong 21 held against an edge 27 of the casing as shown in Figure 3. By turning the trigger from one position to another, the set is adapted to be used for large or small fish, as may be desired.

The extended end of the trigger 10 is provided with an opening 28 to which the leader 18 is attached and the opposite end of the leader is attached to an eye 29 of a hook, such as the hook 17.

The edges 26 and 27 are positioned at the ends of a slot 30 in the end 31 of the casing 11 and as the trigger is drawn downwardly by the action of a fish to the position shown in dotted lines in Figure 1 the end upon which the prongs 20 and 21 are positioned passes through the slot into the casing and the trigger 10 is snapped into the casing by the spring contracting upwardly to the position shown in Figure 4 setting the hook in the mouth of a fish.

The tubular casing 11 is provided with elongated slots 32 which permit free circulation of water through the casing so that the water is not trapped therein and does not retard the action of the spring.

The barb or horn 16 is stamped from the wall of the casing leaving an opening 33 therein and with the barb positioned, as shown in the drawing, the fishing line or leader 18 may be wrapped over the horn in casting to prevent the trigger being accidentally released.

A trigger or latch 10 is retained in the position shown in Fig. 1 or in the position shown in Fig. 3 by the spring 12 and when a fish strikes the bait on the hook extended from the trigger the trigger is drawn downwardly away from the end of the casing 11 and, with the spring retaining the trigger in alignment with the axis of the casing the projections 20 and 21 will be released from the end of the casing and will be drawn upwardly into the casing, as shown in Fig. 4 by the spring.

It will be understood that modifications, within the scope of the appended claims, may be made in the design and arrangement of the parts without departing from the spirit of the invention.

What is claimed is:

1. In a fish hook spring set, the combination which comprises an elongated tubular casing having a slot in one end, a line attaching eye extended from the opposite end, a horn extended from one side and having openings therethrough, a spring positioned in the casing and attached to the end from which the eye extends, a trigger having an enlarged end with prongs extended from opposite edges thereof, means for attaching the trigger to the spring whereby the trigger is retained in the slot in the end of the casing by the spring, and a leader extended from the trigger for attaching a hook to the trigger.

2. In a fish hook spring set, the combination which comprises an elongated tubular casing having a slot in one end, a line attaching eye extended from the opposite end, a horn extended from one side and having openings therethrough, a spring positioned in the casing and attached to the end from which the eye extends, a trigger having an enlarged end with prongs extended from opposite edges thereof, means for attaching the trigger to the spring whereby the trigger is retained in the slot in the end of the casing by the spring, and a leader extended from the trigger for attaching a hook to the trigger, the position of said trigger being adapted to be reversed whereby the force required to release the trigger is variable.

3. In a fish hook spring set, the combination which comprises an elongated tubular casing having a slot in one end, a line attaching eye extended from the opposite end, a horn extended from one side and having openings therethrough, a spring positioned in the casing and attached to the end from which the eye extends, a trigger having an enlarged end with prongs extended from opposite edges thereof, means for attaching the trigger to the spring whereby the trigger is retained in the slot in the end of the casing by the spring, and a leader extended from the trigger for attaching a hook to the trigger, said trigger being adapted to be positioned with the prong at one side in engagement with an edge of the wall of the slot for catching small fish and with the prong on the opposite edge adapted to be retained against the edge of the slot for catching larger fish.

References Cited in the file of this patent

UNITED STATES PATENTS

| 542,917 | Bardsley | July 16, 1895 |
| 1,295,448 | Dingwell | Feb. 25, 1919 |
| 1,383,474 | Lucas | July 5, 1921 |
| 1,614,931 | Pennell | Jan. 18, 1927 |
| 2,204,560 | Allison | June 18, 1940 |
| 2,631,399 | Sowa | Mar. 17, 1953 |

FOREIGN PATENTS

| 81,475 | Norway | 1953 |